Feb. 11, 1964 R. T. HENDRICKSON 3,120,952
SINGLE AXLE SUSPENSION
Filed May 16, 1962 3 Sheets-Sheet 1
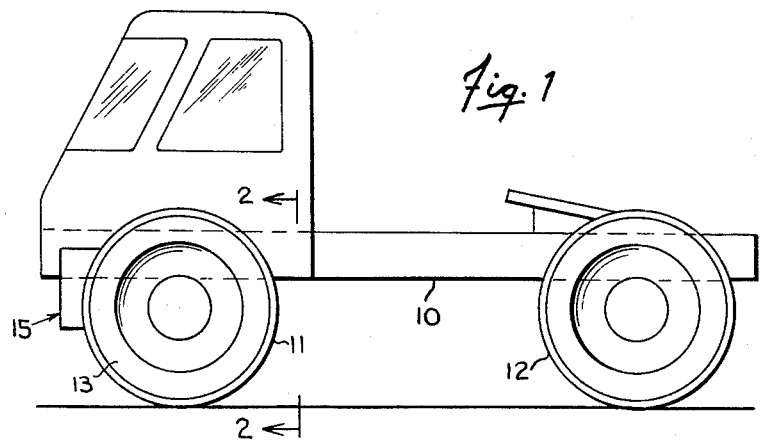
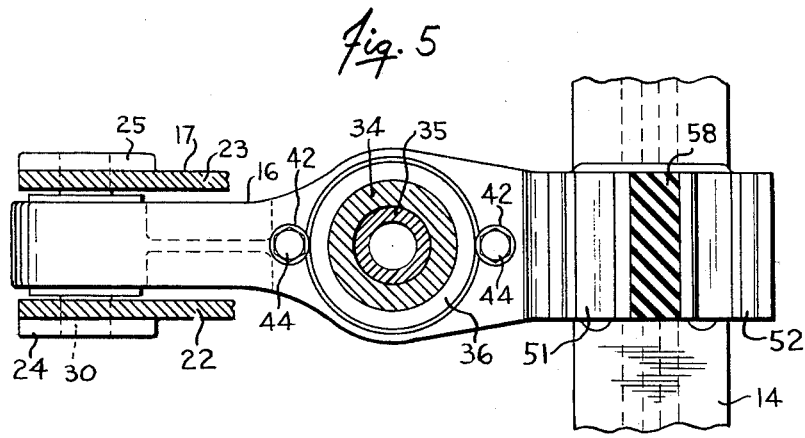
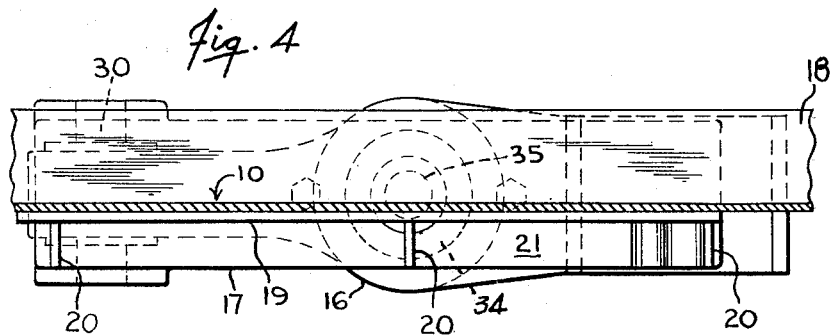
INVENTOR.
ROBERT T. HENDRICKSON
BY
Cromwell, Greist & Warden
ATTYS.

Feb. 11, 1964 R. T. HENDRICKSON 3,120,952
SINGLE AXLE SUSPENSION
Filed May 16, 1962 3 Sheets-Sheet 2
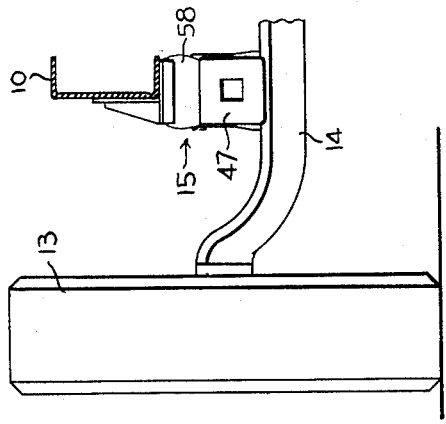
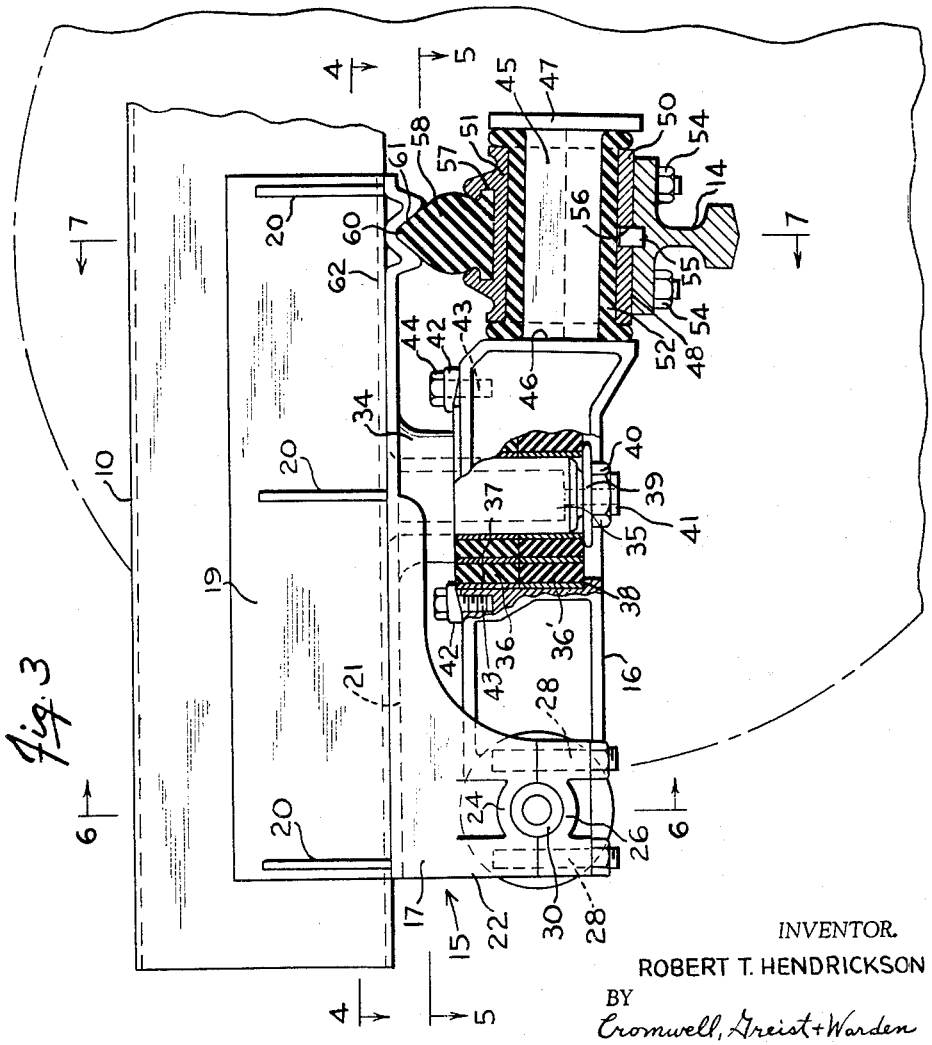
INVENTOR.
ROBERT T. HENDRICKSON
BY
Cromwell, Greist + Warden
ATTYS.

Feb. 11, 1964   R. T. HENDRICKSON   3,120,952
SINGLE AXLE SUSPENSION
Filed May 16, 1962   3 Sheets-Sheet 3
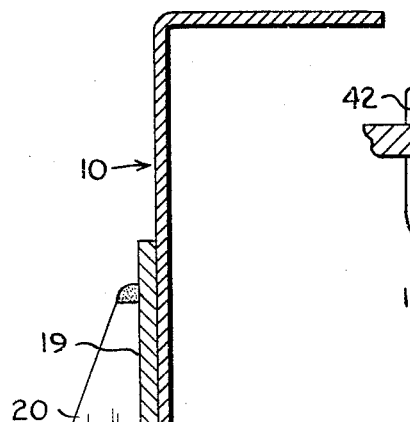
Fig. 7
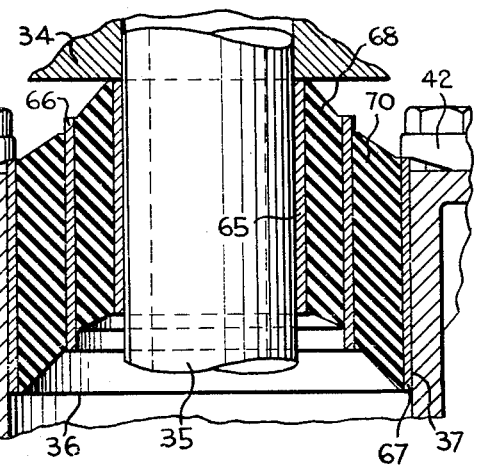
Fig. 8
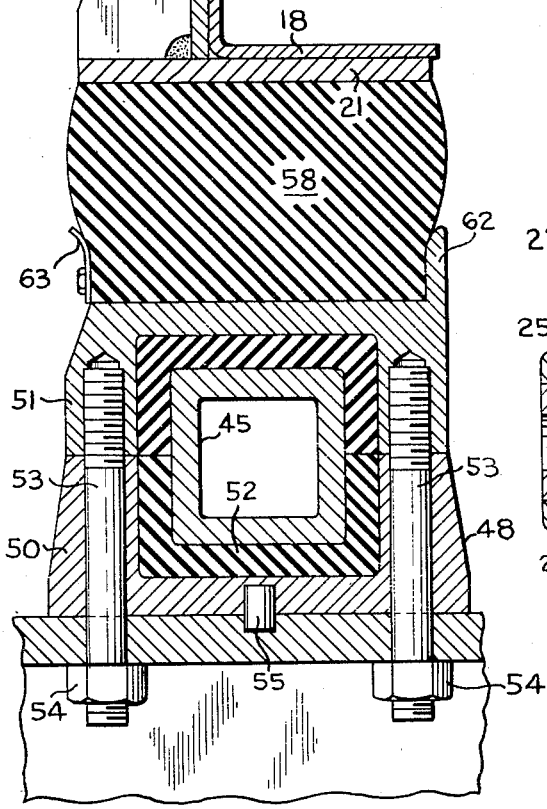
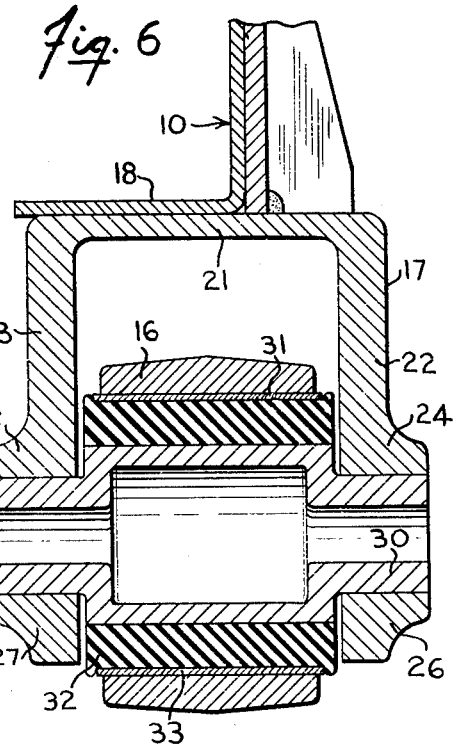
Fig. 6
INVENTOR.
ROBERT T. HENDRICKSON
BY Cromwell, Greist & Warden
ATTY'S.

United States Patent Office 3,120,952
Patented Feb. 11, 1964

3,120,952
SINGLE AXLE SUSPENSION
Robert T. Hendrickson, Hinsdale, Ill., assignor to Hendrickson Manufacturing Co., Lyons, Ill., a corporation of Illinois
Filed May 16, 1962, Ser. No. 195,063
12 Claims. (Cl. 267—21)

This invention relates generally to wheel supported vehicles and is more particularly concerned with improvements in apparatus for providing a resilient suspension of the frame from the axles.

It is a general object of the invention to provide improvements in suspension systems for resiliently mounting or supporting a vehicle on an axle wherein the axle is connected to the frame by suspension units which absorb both vertical load stresses and horizontal stresses such as starting, turning and braking stresses and thereby provide a smoother and steadier ride.

It is a more specific object of the invention to provide an improved resilient suspension for supporting a vehicle frame on an axle wherein longitudinally extending cantilever beam or arm members attached at one end to the axle are resiliently mounted on horizontal and vertically extending pivots fixed relative to the frame and spaced from the axle in the longitudinal direction of the frame.

It is a further object of the invention to provide a suspension system for connecting a wheel axle to the side frame members of a vehicle which comprises cantilever beam members extending longitudinally of the vehicle frame and resiliently mounted on longitudinally spaced, horizontally and vertically disposed pivots carried by depending hanger brackets on the frame with resilient connections between the ends of the beams and the axle whereby positive connections are provided between the vehicle frame and the axle which absorb both horizontal and vertical stresses and cushion the movement of the frame while the vehicle is operating.

It is another object of the invention to provide a springless suspension system for connecting a vehicle frame to an axle wherein rigid beam members are connected to the frame and the axle by means of mounting units employing rubber or rubber-like material which are relied upon to absorb the stresses developing during movement of the vehicle and particularly to cushion the forward and downward movement of the vehicle body when brought to a sudden stop.

Another object of the invention is to provide a new and improved resilient suspension of the character described utilizing components of rubber or rubber-like material which are relatively simple to produce and install, which are economical as to initial cost, which require no lubrication, which are long lasting and which may be replaced when necessary with less labor and less expense than would be involved in the replacement of conventional spring-type suspension elements.

These and other objects and advantages of the invention will be apparent from a consideration of the apparatus which is shown by way of illustration in the accompanying drawings wherein:

FIGURE 1 is a side elevation of a typical vehicle on which the apparatus is adapted to be employed;

FIGURE 2 is a partial vertical section taken on the line 2—2 of FIGURE 1, to an enlarged scale;

FIGURE 3 is a side elevation, on a larger scale, showing the front end of the side frame of the vehicle, with portions broken away and with the outline of the front wheel being indicated;

FIGURE 4 is a horizontal section taken on the line 4—4 of FIGURE 3;

FIGURE 5 is a horizontal section taken on the line 5—5 of FIGURE 3;

FIGURE 6 is a cross section, on a still larger scale, taken on the line 6—6 of FIGURE 3;

FIGURE 7 is a cross section, also on a larger scale, taken on the line 7—7 of FIGURE 3; and FIGURE 8 is a detail section to an enlarged scale through the vertical pivot pin, with portions omitted.

Referring to FIGURE 1, there is illustrated a typical vehicle in which the present apparatus is adapted to be incorporated. The vehicle includes a frame having oppositely disposed side channel members 10 which are connected in supporting relation with front and rear wheel assemblies 11 and 12. The apparatus of the present invention is illustrated as forming a connection between the frame and the front wheel assembly 11 where the front wheel assembly 11 comprises a pair of wheels 13 connected to the opposite ends of an axle 14 in a well known manner. The axle 14 is disposed transversely below the frame side members 10 and a resilient suspension 15 which incorporates the principles of the invention is interposed between the axle 14 and each side frame member 10 immediately adjacent each of the wheels 13.

The apparatus 15 (FIGURES 3 to 8) comprises a cantilever beam or arm member 16 (FIGURES 3 and 5) which is connected at one end to the axle 14 and extends forwardly of the same beneath the side frame member 10. The beam 16 is mounted on a hanger bracket 17 which is in turn secured on the bottom flange 18 (FIGURES 7 and 8) of the frame side channel 10 and on the bottom edge of a frame reinforcing plate 19, the latter being welded or otherwise secured to the vertical face of the frame side channel 10 with suitable reinforcing plates 20 which are welded to the top plate 21 of the bracket 17. The hanger bracket 17 comprises the top plate or base 21 and depending laterally spaced outer and inner side plate members 22 and 23 at the forward end thereof. The side plates 22 and 23 have split hub formations 24 and 25 adjacent their lower ends with removable bottom portions 26 and 27 which are adapted to be held in assembled relation therewith by pairs of stud bolts and nuts 28. The hub formations 24 and 25 are adapted to receive the opposite ends of a cylindrical pivot forming member 30 which is mounted in horizontally disposed relation in the bore 31 in the end of the cantilever beam 16. A sleeve 32 of rubber, or rubber-like resilient material surrounds the enlarged body portion of the pivot member 30 and a metal tube 33 surrounds the rubber sleeve 31. The pin and sleeve assembly is received in the bore 31 and forms a resilient connection between the pin 30 and the end of the cantilever beam 16.

The cantilever beam 16 is connected intermediate its ends also to the frame side channel 10 at a point spaced inwardly of the pivot member 30. The hanger bracket 17 has a boss 34 (FIGURE 3) on its bottom face and a depending cylindrical pivot pin 35 extending downwardly therefrom. The pivot pin 35 extends through a pair of resilient suspension units or shear springs 36 and 36' which are disposed in endwise alignment in a vertically extending bore 37 in the middle portion of the cantilever beam 16. The shear springs are seated on an inwardly extending peripheral shoulder 38 at the lower end of the bore 37 and are held on the pin 35 by a retainer washer 39 and a nut 40 on the threaded lower end portion 41 of the pin 35. The shear springs 36 and 36' are retained in the bore 37 by a pair of clamp members 42 positioned on opposite sides of the top end of the bore 37 which are mounted on studs 43 and held in clamping relation with the outer edge of the top shear spring 36 by clamp nuts 44.

The cantilever beam 16 is connected at its inner end to the axle 14. An integral connecting member in the form of a pin 45 (FIGURES 3 and 7) of square or round cross section extends from the vertical end wall 46 of the body portion of the cantilever beam 16 and terminates at its outer free end in a flange forming end plate 47. The connecting or mounting pin 45 is seated in an axle pad 48 which has cooperating bottom and top members 50 and 51 with a resilient cushion pad member 52 of rubber or rubber-like material interposed between the axle pad 48 and the mounting pin member 45. The axle pad members 50 and 51 are adapted to be held together and also clamped to the top flange of the axle 14 by two pairs of stud bolts 53 having nuts 54 on the threaded lower ends thereof. Preferably, a position locating pin 55 is provided on the top face of the axle 14 and received in an aperture 56 in the bottom member 50 of the axle pad 48. The top member 51 of the axle pad may be provided with a recess or socket 57 on its top face for receiving the flanged bottom of a bumper member 58 which bumper member 58 is formed of rubber or similar resilient material and has a ridge forming triangular shaped top edge 60 adapted to seat in a groove 61 of complementary shape in the end of the top plate 21 of the hanger bracket 17. The pad member 51 has an upstanding flange 62 (FIGURE 7) at one end against which the one end of the bumper member 58 is seated while a clamp or stop member 63 is bolted at the other end of the pad member 51 which locks the bumper member 58 in the recess 57.

The resilient suspension units or shear springs 36 and 36' are of the type shown in Miller Patent No. 2,980,439. Each of these comprises, as shown in FIGURE 8 of the drawings, at least three concentrically arranged rigid cylindrical sleeve members, that is, an inner rigid metal sleeve member 65 having an inner diameter slightly larger than the external diameter of the pin 35, an intermediate rigid metal sleeve member 66 and an outer rigid metal sleeve member 67, the latter having an outside diameter slightly smaller than the inside diameter of the bore 37 in the beam 16. Resilient sleeve members 68 and 70, formed of rubber or rubber-like material, are disposed between and bonded to the rigid sleeve members 65, 66 and 67. The rubber may be permanently united or bonded to the metal so as not to separate therefrom by well known procedures. The resilient sleeve members 68 and 70 are bonded to the rigid sleeve members 65, 66 and 67 so that normally the upper ends of the rigid sleeve members 65, 66 and 67 are disposed at different vertical levels. As shown in FIGURE 8, without the application of any force on the pin 35, the upper ends of the rigid sleeve members are disposed in a downwardly stepped arrangement from the inner sleeve 65 to the outer sleeve 67.

As shown in FIGURE 3, there are two separate resilient suspension units or shear springs 36 and 36' disposed in axial alignment in the bore 37. It is to be understood that a single unit of twice the length could be utilized in place of two units disposed in endwise alignment. As shown, the inner rigid sleeve member 65 abuts the bottom face of the boss 34 and the outer rigid sleeve member 67 is held in the bore 37 by the clamp members 42 which engage the top edge thereof. The bottom unit 36' is held on the pin 35 by engagement of the bottom edge of the inner rigid sleeve member with the retainer washer 39.

The cantilever beam member 16, as illustrated, extends forwardly in the longitudinal direction of the frame 10 from the front axle 14. The beam may be attached to the front axle or any other axle of the vehicle so as to extend either forwardly or rearwardly of the axle and it will function in either position as an effective resilient connection between the axle and the vehicle frame.

While specific materials and particular details of construction are referred to in describing the embodiment of the invention which is illustrated in the dawings, it will be understood that other materials and different structural details may be resorted to within the spirit of the invention.

I claim:

1. A resilient axle suspension interposed between each side of a vehicle frame and axle support means therefor, comprising a vertical pin depending from the frame, a longitudinally extending cantilever forming member having a vertical bore of a substantially greater diameter than the diameter of the vertical pin which vertical bore is located intermediate the ends of said cantilever member, a resilient suspension unit disposed in the bore and connected with the vertical pin which suspension unit includes at least three concentrically arranged rigid sleeve members, resilient sleeve members formed of rubber-like material disposed between and bonded to each pair of adjacent rigid sleeve members in a manner such that normally the upper ends of the rigid sleeve members are disposed in a downwardly stepped arrangement from the inner sleeve member to the outer sleeve member, means for retaining said inner rigid sleeve member on the pin and said outer rigid sleeve member in the bore in the cantilever member whereby said resilient sleeve members are progressively effective, beginning with the innermost one, to resiliently support the frame when increases in the load on the vehicle cause said frame to engage progressively the step-arranged upper ends of the rigid sleeve members which are intermediate said inner and outer rigid sleeve members beginning with the one next adjacent to said inner rigid sleeve member, and said cantilever member being connected at one end to the axle support means and at the other end having a horizontally extending bore, a horizontal pivot pin received in said horizontal bore, a hanger member on the vehicle frame, said horizontal pivot pin being in a depending portion of said hanger member, and a resilient sleeve on said horizontal pivot pin and disposed in said horizontal bore.

2. A resilient axle suspension interposed between each side of a vehicle frame, and axle support means therefor, comprising a vertical pin depending from the frame, a longitudinally extending cantilever forming member having a vertical bore of a substantially greater diameter than the diameter of the vertical pin, said vertical bore being located intermediate the ends of said cantilever member a resilient suspension unit disposed between the vertical pin and the bore which comprises at least three concentrically arranged rigid sleeve members, resilient sleeve members formed of rubber-like material disposed between and bonded to each pair of adjacent rigid sleeve members, means for retaining said inner rigid sleeve members on the pin and said outer rigid sleeve member in the bore in the cantilever member so that said resilient sleeve members are progressively effective to resiliently support the frame when the load on the vehicle frame increases, and said cantilever member being connected at one end and in longitudinal spaced relation relative to said vertical bore to the axle support means, said cantilever member having at the other end a horizontally extending bore for receiving a horizontal pivot pin, said horizontal pivot pin being mounted in fixed relation on the vehicle frame, and a resilient sleeve on the horizontal pivot pin which is disposed in said horizontally extending bore.

3. A resilient axle suspension interposed between each side of a vehicle frame, and axle support means therefor, comprising a vertical pin depending from the frame, a longitudinally extending cantilever forming member having a vertical bore of a substantially greater diameter than the diameter of said vertical pin, a resilient suspension unit disposed between said vertical pin and the bore which comprises concentrically arranged rigid sleeve members and resilient sleeve members formed of rubber-like material disposed between and bonded to each pair of adjacent rigid sleeve members, means for retaining the inner rigid sleeve members on said vertical pin and the outer rigid sleeve members in the bore in the cantilever member whereby said resilient sleeve members are progressively effective to resiliently support the frame when the load thereon increases, said cantilever member being connected at one end to the axle support means and at the other end having a horizontally extending bore which receives a horizontal pivot pin, a hanger member depending from the frame, said horizontal pivot pin being mounted in said hanger member and a resilient connecting sleeve mounted on the horizontal pivot pin and disposed in the horizontally extending bore, said connection with said axle support means and said horizontal bore being spaced on opposite sides of said vertical bore.

4. A resilient axle suspension as recited in claim 3, and said cantilever member being connected to the axle support means by clamping members secured on the axle and encasing an end portion of the cantilever member with a resilient member interposed between the clamping members and said cantilever member.

5. In a resilient axle suspension which is to be interposed between each of the parallel side members of a vehicle frame and axle support means therefor, a hanger member fixed on the side frame and having a vertical pin depending therefrom, a longitudinally extending cantilever forming member extending parallel with its associated frame side member and having a vertical bore intermediate its ends which has a substantially greater diameter than the diameter of said vertical pin, a resilient suspension unit disposed between said vertical pin and said vertical bore which suspension unit comprises at least three concentrically arranged, vertically disposed rigid sleeve members, resilient sleeve members formed of rubber-like material disposed between and bonded to each pair of adjacent rigid sleeve members in a manner such that normally the upper ends of the rigid sleeve members are disposed in a downwardly stepped arrangement from the inner sleeve member to the outer sleeve member, means for retaining said inner rigid sleeve member on said vertical pin and said outer rigid sleeve in the bore in the cantilever member whereby said resilient sleeve members are progressively effective, beginning with the innermost one, to resiliently support the frame when increases in the load on the vehicle cause said frame to engage progressively the step-arranged upper ends of the rigid sleeve members intermediate said inner and outer rigid sleeve members beginning with the one next adjacent to said inner rigid sleeve member, and said cantilever member having a pin-like end formation resiliently clamped to the axle support means and having a horizontally extending bore at the other end, a hanger member fixed on the frame side member, a horizontal pivot pin having its ends mounted in depending portions of said hanger member, and a resilient sleeve secured on said horizontal pivot pin and disposed in the horizontal bore of said cantilever member.

6. In a vehicle suspension system for connecting a vehicle frame to the axle of a wheel and axle assembly a longitudinally extending cantilever beam interposed between the vehicle frame and the axle, said cantilever beam having a connection at one end thereof with the axle so that it extends therefrom in the lengthwise direction of the vehicle frame and parallel with a side member of said vehicle frame, a hanger bracket fixed to the vehicle side frame and having depending, laterally spaced portions supporting a horizontal pivot pin so that it extends crosswise of the vehicle frame, said horizontal pivot pin having a resilient sleeve thereon, said cantilever beam having a bore at the end thereof remote from the axle in which said resilient sleeve is mounted, a vertical pin depending beneath said hanger bracket and extending into an apertured portion of said cantilever beam at a point between the connection thereof with said axle and said horizontal pivot pin, and resilient cushion forming members connecting said vertical pin with said cantilever beam so as to absorb vertical and transverse stresses.

7. A resilient axle suspension interposed between each side of a vehicle frame and an axle support means therefor comprising a cantilever beam forming member disposed beneath the frame and extending longitudinally of the vehicle frame and parallel with a frame side member, said cantilever beam having one end in the form of a longitudinally extending pin, a resilient sleeve surrounding said pin and a pad forming and clamping member surrounding said resilient sleeve and rigidly attached to said axle at a fixed point, said cantilever beam having a vertically extending bore intermediate its ends and a horizontally extending bore at the end thereof remote from the axle, a bracket fixed on the vehicle frame and having a depending, vertically disposed pin received in the vertical bore in the cantilever beam, said bracket having a depending portion with a horizontally disposed pivot pin received in the horizontal bore in the end of said cantilever beam, and sleeve-like resilient members interposed between the cantilever beam member and the pins and connecting the same so as to absorb horizontal and vertical stresses.

8. A resilient axle suspension as recited in claim 7, and a bumper member of resilient and compressible material mounted on said pad forming and clamping member beneath the vehicle frame for limiting the relative vertical movement of the frame and the axle.

9. A resilient axle suspension as recited in claim 7, and a resilient and compressible member interposed between the vehicle frame and the axle at the point of attachment of the cantilever beam to the axle so as to cushion relative vertical movement of the frame and the axle.

10. A resilient axle suspension interposed between each side of a vehicle frame and the transversely extending axle of a support means therefor comprising a cantilever beam forming member disposed adjacent the frame and extending longitudinally of the vehicle, said cantilever beam having at one end a longitudinally extending pin, a cushion forming stress absorbing resilient sleeve surrounding said pin and a pad forming member surrounding said sleeve and rigidly attached to said axle, said cantilever beam having a vertically extending recess intermediate its ends and a horizontally extending recess at the end thereof remote from the axle, a bracket fixed on the vehicle frame with a depending, vertically disposed pin which is received in the vertical recess in the cantilever beam, said bracket having mounted thereon a horizontally disposed pin received in the horizontal recess in the end of said cantilever beam, and cushion forming stress absorbing resilient members disposed in the recesses in the cantilever beam and secured to the pins which are mounted on said bracket.

11. A resilient axle suspension interposed between each side of a vehicle frame and the transversely extending axle of a support means therefor comprising a cantilever beam forming member disposed in parallel relation beneath the frame of said member and extending longitudinally of the vehicle frame, said cantilever beam having one end positioned at the axle, a sleeve of rubber-like material surrounding an end portion of said cantilever beam and a clamping member surrounding said sleeve and rigidly attached to said axle, said cantilever beam having a vertically extending bore intermediate its ends and a horizontally extending bore spaced from the vertical bore in the direction of the end thereof remote from the axle, a vertically disposed pin depending from the vehicle frame and received in the vertical bore in the cantilever beam, a horizontally disposed pin fixed relative to the vehicle frame and received in the horizontal bore in said cantilever beam, and sleeve members of rubber-like material disposed in the bores of the cantilever beam and encasing portions of said pins so as to resiliently connect the vehicle frame and the cantilever beam.

12. A resilient axle suspension interposed between each side of a vehicle frame and the transversely extending axle of a support means therefor comprising a cantilever beam forming member disposed in longitudinally extending relation beneath the vehicle frame, said cantilever beam having one end in the form of a longitudinally extending pin, a resilient sleeve surrounding said pin and a clamping member surrounding said resilient sleeve and rigidly attached to said axle, said cantilever beam having a vertically extending bore spaced in the longitudinal direction from said end pin and a horizontally extending bore spaced from said vertically extending bore in the direction of the end thereof which is remote from the axle, a fixed bracket on the vehicle frame having a depending, vertically disposed pin received in the vertical bore in the cantilever beam, a horizontally disposed pin supported on said bracket and received in the horizontal bore in said cantilever beam, and sleeve members of rubber-like material seated in the vertical and horizontal bores of the centilever beam and secured to the pins on said bracket.

References Cited in the file of this patent
UNITED STATES PATENTS

| | | |
|---|---|---|
| 2,689,015 | Nallinger | Sept. 14, 1954 |
| 2,817,510 | Hoban | Dec. 24, 1957 |
| 2,905,459 | Fikse | Sept. 22, 1959 |
| 2,980,439 | Miller | Apr. 18, 1961 |